US005134761A

United States Patent [19]

Sato et al.

[11] Patent Number: 5,134,761

[45] Date of Patent: Aug. 4, 1992

[54] ELECTRICAL INSULATING OIL COMPOSITION AND CAPACITORS PREPARED THEREWITH

[75] Inventors: Atsushi Sato, Tokyo; Shigenobu Kawakami, Chiba; Keiji Endo; Hideyuki Dohi, both of Kanagawa, all of Japan

[73] Assignee: Nippon Petrochemicals Company, Limited, Tokyo, Japan

[21] Appl. No.: 697,199

[22] Filed: May 8, 1991

Related U.S. Application Data

[63] Continuation-in-part of Ser. No. 93,793, Sep. 4, 1987.

[30] Foreign Application Priority Data

Sep. 4, 1986 [JP] Japan ................................ 61-208542

[51] Int. Cl.[5] ........................... H01G 4/22; H01B 3/22

[52] U.S. Cl. ..................................... 29/25.41; 585/6.3; 585/24; 585/25

[58] Field of Search .................... 29/25.4; 585/6.3, 24, 585/25

[56] References Cited

U.S. PATENT DOCUMENTS

| | | | |
|---|---|---|---|
| 5,015,793 | 5/1991 | Sato et al. | 585/6.3 |
| 5,017,733 | 5/1991 | Sato et al. | 585/6.3 |
| 5,081,757 | 1/1992 | Sato et al. | 585/24 |
| 5,081,758 | 1/1992 | Sato et al. | 29/25.41 |

FOREIGN PATENT DOCUMENTS

| | | |
|---|---|---|
| 3127905 | 2/1983 | Fed. Rep. of Germany . |

*Primary Examiner*—Asok Pal

*Attorney, Agent, or Firm*—Scully, Scott, Murphy & Presser

[57] ABSTRACT

A new electrical insulating oil composition having improved low temperature characteristics which composition comprises a mixture of 40% by weight or more of benzyltoluene and the remainder of alkyl substituted diphenylmethane having 15 to 17 carbon atoms which is represented by the following general formula:

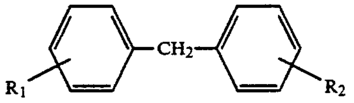

wherein $R_1$ and $R_2$ are $C_1$ to $C_4$ alkyl groups and the total number of carbon atoms in $R_1$ and $R_2$ is 1 to 4, except that $R_1$ and $R_2$ are simultaneously methyl groups; and the proportion of the total quantity of solid phase calculated according to the following general solid-liquid equilibrium equation is 45% by weight or less relative to the total quantity of said composition at $-40°$ C.:

$$X_i = \exp\left[\frac{\Delta H_f}{R}\left(\frac{1}{T_f} - \frac{1}{T}\right)\right]$$

wherein $X_i$ is the equilibrium mole fraction of a component i, in the liquid phase, $\Delta H_f$ is the heat of fusion ($cal.mol^{-1}$), $T_f$ is the melting point (K), T is the temperature (K) of the system, and R is the gas constant ($cal.mol^{-1}.K^{-1}$). Electrical capacitors prepared with these electrical insulating oil compositions provide excellent operation at temperatures as low as $-40°$ C., preferably as low as $-50°$ C.

10 Claims, 5 Drawing Sheets

ELECTRICAL INSULATING OIL COMPOSITION AND CAPACITORS PREPARED THEREWITH

CROSS-REFERENCE TO RELATED APPLICATION

This application is a continuation-in-part of application Ser. No. 093,793, filed Sep. 4, 1987.

BACKGROUND OF THE INVENTION

1. Field of the Invention

This invention relates to an electrical insulating oil composition, a capacitor impregnated with the electrical insulating oil composition, a method for producing the capacitor and a method of operating the capacitor. More particularly, the invention relates to an electrical insulating oil composition which has high hydrogen gas absorbing capacity and can be employed in a capacitor operating at a very wide temperature range, for example, at room temperature to temperatures as low as −40° C. or −50° C.

2. Description of the Prior Art

In the conventional art, PCB (polychlorobiphenyl) was used all over the world as an insulating oil for high power capacitors for electric power. PCB has a high dielectric constant, however, the use of PCB was prohibited because its toxicity was found. After that, in order to provide insulating oils having a high dielectric constant, there have been proposed insulating oils comprising a mixture of chlorinated alkyldiphenyl ether, phthalic acid esters and benzene trichloride; and esters of benzyl alcohol and fatty acids.

The oils having a high dielectric constant such as PCB were used for capacitors in which a solid insulating material of insulating paper or combined film of insulating paper and biaxially oriented polypropylene film was used. However, as the power loss of PCB and paper is large, the power loss of capacitors with these materials was large as the whole, especially at lower temperatures. For example, the loss at temperatures of +10° to +20° C. is approximately 0.1%, meanwhile the loss increases abruptly by ten times to 1% at temperatures of −20° C. to −30° C. For this reason, the generation of heat by the power loss in a capacitor cannot be disregarded and the temperature rise of +20° C. to +30° C. is caused to occur which depends upon the sizes of capacitors, kinds of of solid insulating materials and configurations of electrodes. As a result, even when the temperature of an insulating oil is low, for example below the pour point, the temperature is gradually raised by the internal heat generation of the capacitor. The temperature thus exceeds the pour point of the insulating oil in due course, and finally, the viscosity is lowered and the insulating oil can functions as a liquid substantially. As a result, PCB was regarded that it can be used under considerably low temperature conditions. In other words, the heat generation by power loss is essentially undesirable, however, it was exceptionally regarded desirable in the case of PCB in low temperature uses.

Meanwhile, bicyclic aromatic hydrocarbons such as 1-phenyl-1-xylylethane (PXE) and monoisopropylbiphenyl (MIPB) were proposed as the substitute for PCB. The power loss of them is small as compared with that of PCB. The loss is on the level of about 0.01% to 0.02% which is one tenth of PCB capacitor. Even at temperatures as low as −40° C., the dielectric loss does not exceed 0.1%. Accordingly, the temperature rise in a capacitor owing to the power loss is generally lower than 5° C. In the case of capacitors impregnated with the bicyclic aromatic hydrocarbons, the compensation by the self heat generation of power loss at lower temperatures like PCB capacitors cannot be expected.

The insulating oils of the series of the foregoing bicyclic aromatic hydrocarbons are excellent in the partial discharge characteristic as compared with PCB and the like compounds having a high dielectric constant. In addition, the former ones are excellent also in impregnating property relative to solid insulating materials such as plastic films. Accordingly, the power capacitors are mainly impregnated with them.

For the above reason, it has been eagerly desired to propose bicyclic aromatic hydrocarbons that are useful in lower temperatures with making the most of the advantages of the bicyclic aromatic hydrocarbons.

There are following conditions for the electrical insulating oils of bicyclic aromatic hydrocarbons which is suitable for impregnating foil-wound type film capacitors:

(1) The proportion of aromatic carbons in the molecule is high. The compound having aromatic hydrocarbons of a high proportion excels in hydrogen gas absorbing capacity and voltage withstanding characteristic.

(2) In order to improve the low temperature characteristics, a lower melting point is desirable.

(3) The compound must be a liquid of low viscosity even in low temperatures.

In the first place, alkyl groups having 1 to 5 carbon atoms were added to the skeletal carbon chains of 1,1-diphenylethane so as to synthesize the model compounds of the basic skeletal structure of bicyclic aromatic hydrocarbons. The properties as synthetic oils were investigated with regard to the six kinds of synthetic oils including the compound having only the basic skeletal structure by the inventors of the present invention.

The structures of the synthetic oils are represented by the following structural formula:

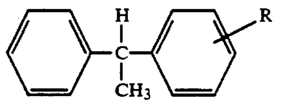

wherein R is a methyl group, two methyl groups, an ethyl group, an isopropyl group, a tert-butyl group, or a tert-amyl group.

Each of the synthetic oils were refined by clay treatment to make the dielectric loss tangent below 0.02% at 80° C., which was followed by several kinds of tests as insulating oils for capacitors. In order to observe the basic property as insulating oils, hydrogen gas absorbing capacity was measured, the results of which are shown in FIG. 5. According to these results, the hydrogen gas absorbing capacity increases with the decrease of the number of carbon atoms in substituent groups, i.e., with the rise of aromaticity (the percentage of aromatic carbons in the total structure).

The above experiment was done in connection with diphenylethane. However, a similar tendency in hydrogen gas absorbing capacity was observed in connection with diphenylmethane and its lower alkyl nuclear derivatives As the bicyclic aromatic hydrocarbons having a highest proportion of aromatic carbons in molecules, noncondensed bicyclic aromatic hydrocarbons having smallest numbers of 12 and 13 carbon atoms are exemplified. However, the melting points of all of these bicyclic aromatic hydrocarbons having 12 and 13 carbon atoms are high or their flash points are low. Therefore, they cannot be used as practical electrical insulating oils.

Accordingly, we cannot but select compounds from bicyclic aromatic hydrocarbons having 14 or more carbon atoms.

As a condition for an insulating oil having good low temperature characteristics, the reason for observing the viscosity at low temperatures is as follows:

If there is neither foreign substance nor defect in crystalline structure in insulating materials such as film or paper, or there is no weak deteriorated portion of the film caused by an insulating oil, the partial discharge at lower temperatures will firstly occur and the solid insulating material then suffers damages, or by the expansion of discharge, the capacitor is finally broken down.

The conditions until the beginning of partial discharge is considered as follows:

As a preliminary phenomenon, the electric potential is concentrated to the projected portions of electrode or weakened portions of solid insulating material, then gases, mainly hydrogen gas, are produced from the insulating oil surrounding such the portions. The gases are produced intensively from one portion, or they are produced in a plurality of points simultaneously. The produced gases are dissolved in the insulating oil in the initial stage and they are diffused by the difference in gas concentration or the movement of liquid dissolving gases. Meanwhile, because the bicyclic aromatic hydrocarbons generally can absorb hydrogen gas, it is considered that the absorption of gas is occurring in other portions where gas is not produced. When the quantity of produced gas exceeds the quantities to be diffused and absorbed, it exceeds the saturation level and minute bubbles are produced and finally the electric discharge is caused to occur. One of parameters for this phenomenon is the difficulty in gas generation of an insulating oil, which is considered to be closely related to the hydrogen gas absorbing capacity of the insulating oil. Another parameter is the rate of gas diffusion in the insulating oil. It is considered that the gas diffusion is caused by the combination of the phenomenon of diffusion owing to the difference in gas concentrations and the phenomenon of transfer of dissolved gas owing to the flow of liquid. Both of these two phenomena are functions of viscosity. If a temperature is the same, it is considered that a lower viscosity is advantageous because the rate of diffusion is large.

Benzyltoluenes have 14 carbon atoms and they are one group of the bicyclic aromatic hydrocarbons which are highest in aromaticity. In addition, with regard to the benzyltoluenes, the viscosity of their isomer mixture is less than 200 cSt at −50° C. in a supercooled condition before crystals are separated out. Taking the low temperature of −50° C. into consideration, its viscosity is very low. In general, the viscosity at the pour point or its vicinity is tens of thousands to a hundred thousands cSt. Therefore, it can be said that the viscosities of benzyltoluenes at low temperatures are very low and they have good low temperature characteristics as electrical insulating oils.

Furthermore, in view of the foregoing FIG. 5, excellent hydrogen gas absorbing capacity for benzyltoluene is indicated.

From these points, if benzyltoluene is used as a base oil for capacitors, it might be expected that capacitors having excellent performance can be produced.

U.S. Pat. No. 4,054,937 discloses a capacitor which is impregnated with a composition prepared by mixing, for example, diethyldiphenylmethane with a base oil of ethyldiphenylmethane. However, it is apparent for the above reason that capacitors using ethyldiphenylmethane as a base oil would be inferior to those using a base oil of benzyltoluene.

With regard to benzyltoluenes, examples of o-benzyltoluene, p-benzyltoluene and the mixtures of these benzyltoluenes and dibenzyltoluene are disclosed in Japanese Patent Publication No. 55-5689. Furthermore, disclosed in U.S. Pat. No. 4,523,044 are examples of electrical insulating oils comprising oligomer compositions obtained by reacting benzyl chloride with toluene in the presence of iron chloride catalyst, that is, the mixture of substantially benzyltoluenes and dibenzyltoluenes.

Furthermore, an electrical insulating oil consisting of a mixture of benzyltoluene and dibenzyltoluene has been commercialized as "JARYLEC C-100" (trademark) by Prodelec Co. in France.

As disclosed in the foregoing reference, these benzyltoluenes are prepared from benzyl chloride and toluene by Friedel-Crafts reaction using iron chloride catalyst which is high in o-, p-orientation. Accordingly, the main components are o-benzyltoluene and p-benzyltoluene and the quantity of m-benzyltoluene is small. It is considered that the dibenzyltoluene was by-produced in the preparation of the benzyltoluenes.

In order to improve the low temperature characteristic of an insulating oil, the melting point thereof is desirably low. According to references, the melting points of the position isomers of benzyltoluenes are as follows:

TABLE 1

Position Isomers of Benzyltoluenes

| Compound | Melting Point (°C.) | Heat of Fusion (cal/mol) |
|---|---|---|
| o-Benzyltoluene | +6.6 | 5000 |
| m-Benzyltoluene | −27.8 | 4700 |
| p-Benzyltoluene | +4.6 | 4900 |

In view of the above Table 1, the melting points of o-isomer and p-isomer themselves are high, so that they cannot be used singly even in the Temperate Zone. m-Benzyltoluene is a component of a small quantity (less than 10%) in the foregoing U.S. Pat. No. 4,523,044 and in JARYLEC C-100 (trademark). It has a lowest melting point among these position isomers, however, its melting point is higher than the pour point that is provided in a common standard (e.g. Japanese Industrial Standards, JIS) for the mineral insulating oils.

That is, as described above, the viscosities at low temperatures of benzyltoluenes are low, however, their melting points are not always satisfactory.

In order to solve such a problem, dibenzyltoluene produced as a by-product is mixed with benzyltoluene in the description of U.S. Pat. No. 4,523,044.

For example, in the foregoing JARYLEC C-100 which is considered to be the same as the description of the above patent specification, about 20% by weight of dibenzyltoluene is added to benzyltoluenes. The depression of freezing point (the point at which crystals are separated out) is proportional to the number of moles of added substance, known as the phenomenon of freezing point depression. Accordingly, 20% by weight of dibenzyltoluene corresponds to 14.3% by molar concentration. At this molar concentration, the depression of the point of separating out is only 6° to 8° C. In other words, the effect of depressing the temperature of separating out is not so large for its weight as added because the molecular weight of dibenzyltoluene is large. In addition, the advantage of low viscosity of benzyltoluene is impaired by the addition of dibenzyltoluene because the viscosity of dibenzyltoluene is higher than that of benzyltoluene.

Even when the separating out of crystals is apparently restrained by the supercooling, it is rather not desirable because viscosity becomes higher at low temperatures.

This fact was confirmed by tracing the disclosure of the foregoing U.S. Pat. No. 4,523,044 with the experiment of the present inventors as follows:

In the like manner as the example in the above reference, benzyl chloride and toluene were reacted in the presence of a catalyst of $FeCl_3$; and benzyltoluene and dibenzyltoluene were obtained by distillation. These benzyltoluene and dibenzyltoluene in a weight ratio of 80:20 were mixed together. The contents of isomers of the benzyltoluene in the obtained mixture were o-isomer: 39.1 wt %, m-isomer: 5.4 wt % and p-isomer: 35.5 wt %, which were almost coincident with the analytical values of the above JARYLEC C-100 of o-isomer: 36.2 wt %, m-isomer: 5.9 wt % and p-isomer: 37.8 wt %.

The above synthesized benzyltoluene, the mixture of benzyltoluene and dibenzyltoluene, and JARYLEC C-100 were respectively put in stoppered test tubes. They were left to stand in a temperature-programmable refrigerator to observe the state of separating out of crystals. One temperature cycle was 12 hours between −40° C. and −50° C.

According to the results of this test, crystals were separated out after 1 to 3 days and the whole was solidified in the case of only benzyltoluene. In the case of the mixture of benzyltoluene/dibenzyltoluene and JARYLEC C-100, the separating out of crystals began after 4 to 7 days and crystals grew gradually, and after 2 weeks, crystals were observed on almost all the walls of test tubes. That is, the viscosity was increased by the addition of dibenzyltoluene to maintain the supercooled state long, and the time period for crystallizing out was prolonged. Accordingly, even though crystals were separated out finally, the crystallizing out was retarded by the addition of dibenzyltoluene.

However, because the viscosity is definitely raised by the addition of dibenzyltoluene, it is adverse to the object of the present invention to obtain an electrical insulating oil which has a low viscosity even at low temperatures.

Therefore, the method of the foregoing U.S. Pat. No. 4,523,044 cannot provide substantial improvement in benzyltoluene.

BRIEF SUMMARY OF THE INVENTION

Inventors of the present application made detailed investigation by experiments with regard to the calculated proportions of solid phase in liquid insulating oils at lower temperatures of −40° C. to −50° C. As a result, the present invention has been accomplished.

It is therefore the object of the present invention to provide a novel electrical insulating oil composition which is excellent in low temperature characteristics.

Another object of the present invention is to provide a novel electrical insulating oil composition which is suitable for use in impregnating oil-filled capacitors.

A further object of the present invention is to provide a novel electrical insulating oil composition which can be easily produced and used in the practical industries.

That is, the electrical insulating oil composition of the present invention is excellent in low temperature characteristics and comprises a mixture of 40% by weight or more of benzyltoluene and the remainder of alkyl substituted diphenylmethane having 15 to 17 carbon atoms which is represented by the general formula (I):

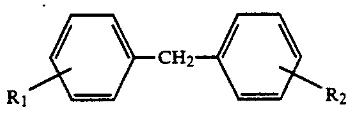

(I)

wherein each of $R_1$ and $R_2$ is a hydrogen atom or a $C_1$ to $C_4$ alkyl group and the total number of carbon atoms in $R_1$ and $R_2$ is not more than 4, with the proviso that $R_1$ and $R_2$ may not simultaneously be methyl groups, and the proportion of the total quantity of solid phase that is calculated with regard to each component according to the following solid-liquid equilibrium equation is 45% by weight or less in the composition at −40° C.:

$$X_i = \exp\left[\frac{\Delta H_f}{R}\left(\frac{1}{T_f} - \frac{1}{T}\right)\right]$$

wherein $X_i$ is the equilibrium mole fraction of a component i in the liquid phase of said composition, $\Delta H_f$ is the heat of fusion ($cal.mol^{-1}$) of said component as a pure substance, $T_f$ is the melting point (K) of said component as a pure substance, T is the temperature (K) of the system, and R is the gas constant ($cal.mol^{-1}.K^{-1}$).

When position isomers of a compound having different melting points or heats of fusion are employed, the above equation is employed for each position isomer. For example, as shown in the foregoing Table 1, there are three position isomers of benzyltoluene, each having different melting points or hats of fusion. Accordingly, the o-isomer, m-isomer and p-isomer of benzyltoluene are each considered a separate component. In other words, the above solid-liquid equilibrium equation is separately and independently applicable to each isomer which is different in its melting point or heat of fusion.

BRIEF DESCRIPTION OF THE DRAWINGS

These and other objects and features of the present invention will become more apparent from the following description taken in connection with the accompanying drawings, in which.

DETAILED DESCRIPTION OF THE INVENTION

Figure 1:
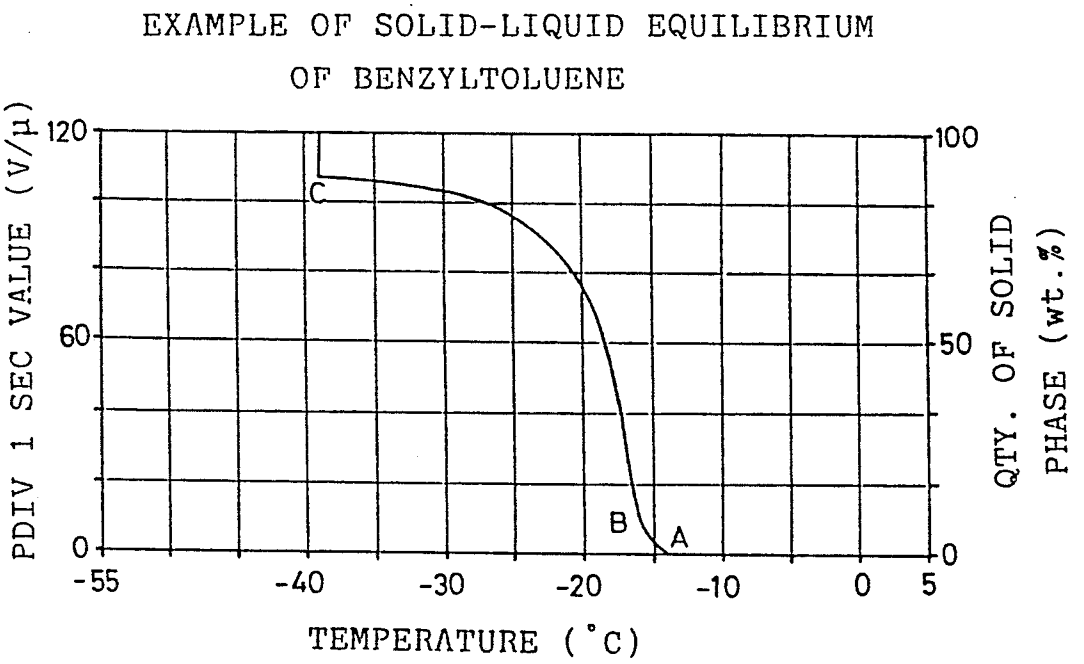
FIG. 1 is a graphic chart showing the solid-liquid equilibrium of a mixture of benzyltoluene isomers.

The present invention will be described in more detail.

When the melting point and the heat of fusion of a compound are given, the following general equation of solid-liquid equilibrium can be applied between the solid phase of the compound and the liquid containing the compound in equilibrium at a certain temperature:

$$X_i = \frac{1}{r_i} \exp\left[\frac{\Delta H_i^f}{R}\left(\frac{1}{T_i^f} - \frac{1}{T}\right)\right]$$

wherein $r_i$ is an activity coefficient, and $X_i$, $\Delta H_i^f$ and R are the same as the foregoing equation.

Accordingly, in a multi-component system, the temperature at which crystals are separated out, the quantity of separated crystals and the eutectic point in the system can be calculated provided that the components can be mixed together at arbitrary ratios in liquid state but they can not be mixed in solid state, that is, they does not form any solid solution.

The above calculation can be done according to the conventional calculation method for solid-liquid equilibrium theory of thermodynamics except the determination of the activity coefficient. In the case of multi-component systems, it is convenient to use a computer which permits the calculations to be made rapidly even when a composition requires many components or a large number of compositions are to be prepared. Accordingly, any particular composition can be obtained without difficulty. For example, the calculation of solid-liquid equilibrium with regard to a simple two-component system is described in Chapter 6, "Solution and Phase Equilibrium", Physical Chemistry, Walter J. Moore, second edition, published by Prentice-Hall.

With regard to the activity coefficient, when activity coefficients determined, for example, by ASOG (Analytical Solution of Groups) method are compared with the cases in which activity coefficients are assumed as 1, it was found that they coincide with each other within a temperature of 1° C. in the systems of benzyltoluene isomers, above-described $C_{15}$ to $C_{17}$ alkyldiphenylmethanes and their mixture. In the present invention, therefore, the foregoing general solid-liquid equilibrium equation is used hereinafter on the assumption that the activity coefficients are 1, respectively.

The exemplary calculation on solid phase will be described briefly. Assuming that a liquid insulating oil consists of Substance A and Substance B. The eutectic point of this two-component system can be obtained by solving two simultaneous equations of the foregoing solid-liquid equilibrium equation in Substance A and another equation in Substance B.

When the temperature of a system is below the above obtained eutectic point, all the components of this composition are solidified, so that the proportion of solid phase is 100%.

When the temperature of a system is above the eutectic point, the temperature of the system is substituted for the temperature of the solid-liquid equilibrium equation to obtain the respective mole fractions $X_A$ and $X_B$. They are then compared with the mole fractions $X_A^l$ and $X_B^l$ for 100% liquid, respectively. If the value of $X_A^l - X_A$ is positive, An amount of Substance A corresponding to this value separates out as solid. In connection with B, the amount to be separated out can be calculated likewise. The sum of these values is the quantity of solid phase in the system. Incidentally, because the quantities of each substances that are separated out can be known, the composition of the relevant liquid phase can be calculated by inverse operation.

In the present invention, the quantities of separated crystals are calculated by the above solid-liquid equilibrium equation. Even though it is not impossible to obtain these values by experiment, the factor of probability is liable to influence on the experimental results, and especially, the measurement of the quantity of separated crystals is difficult.

The reason is that, for example, the time to separate out crystals from a supercooled solution is somewhat incidental and the positions of separating out are irregular and uneven. When crystals are separated out, they generally deposit on minute nucleus substances floating in the solution or on the surfaces of electrodes, solid insulating materials, inside wall od the container or the like, or in the experiment using a glass test tube, on the inside wall of the tube, especially along scratches in the inside wall surface. However, the separating out of crystals is anyway irregular and incidental.

It is effectual for merely confirming the possibility or occurrence of the separating out of crystals to add as seeds the crystals of a compound which has a similar structure and a boiling point higher than that of the compound to be separated. However, because the apparent volume of crystals varies with the form of crystals and the manner of crystallizing, the amount of separating out of crystals cannot be determined quantitatively by experiment. The measurement in low temperatures is especially more difficult.

It is thoughtless to suppose the properties and reliability of commercially available capacitors impregnated with insulating oils on the basis of unclear and incidental experimental results such as the amounts of separating out of crystals which are determined by experiments. Meanwhile, according to the present invention, it depends upon the quantities calculated with the foregoing solid-liquid equilibrium equation, so that the conclusion is quite correct and reliable.

When the low temperature characteristics are considered, −40° C., preferably −50° C. is taken as a definite temperature.

As described already, the viscosity of benzyltoluene is low even at low temperatures. However, as described below, even when the melting point is lowered by mixing the position isomers of benzyltoluene, they cannot exist as a liquid at −40° C.

The quantities of solid phase at several temperatures were calculated according to the foregoing solid-liquid equilibrium equation with regard to the isomer mixture (o-isomer: 48.9 wt %, m-isomer: 6.8 wt %, p-isomer: 44.3 wt %) of benzyltoluene which was obtained by the tracing experiment of U.S. Pat. No. 4,523,044, the results of which are shown in FIG. 1.

In the same drawing, the o-isomer is separated out between the points A and B with the lowering of temperature, and the o-isomer and the p-isomer are simultaneously separated out between the points B and C. At point C, the m-isomer participate in them to be separated out together. This point is the eutectic point (−38.9° C.) at which the three components are simultaneously separated out to become a solid. In this drawing, even though the quantity is small, the crystallizing out begins between −14° C. and −15° C. Accordingly, an isomer mixture of benzyltoluene of the same composition was actually prepared by the inventors of the present application and it was cooled to a temperature below the eutectic point to change all of them into a solid. After that, the temperature was gradually raised and observed the temperature at which the crystals melted away. The temperature was well coincident with the foregoing temperature within a range of 1° to 2° C.

As will be understood in view of FIG. 1, the eutectic point is −38.9° C. in the system consisting of the 3 kinds of isomers of benzyltoluene. Even when these 3 kinds of isomers are mixed together in any compounding ratio, all the obtained mixture exists as crystals below the eutectic point. Accordingly, it is impossible to use as a liquid at temperatures below the eutectic point. It is, therefore, apparent that the mixture of only the isomers of benzyltoluene is not suitable for use at −40° C., that is the objective temperature for low temperature characteristics.

As described above, benzyltoluene is used with adding dibenzyltoluene in the disclosure of U.S. Pat. No. 4,523,044.

Figure 2:
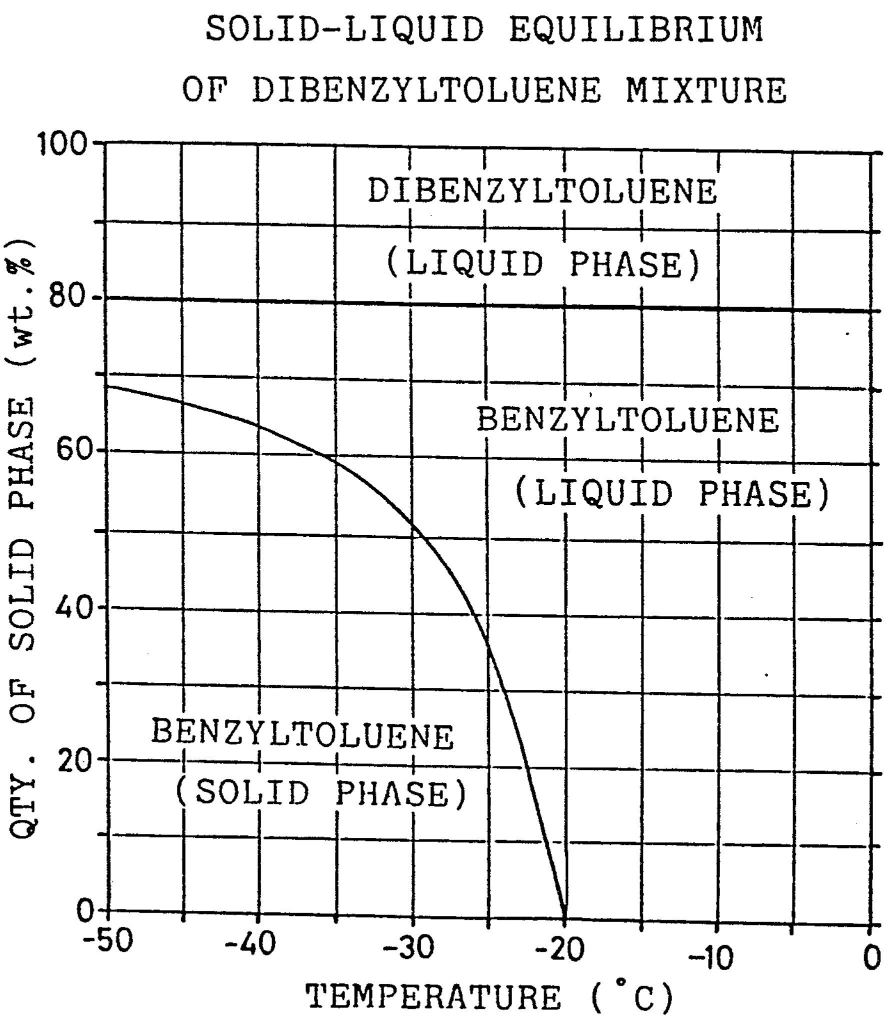
FIG. 2 is a graphic chart showing the solid-liquid equilibrium of a mixture of dibenzyltoluene.

Accordingly, the system that 20% by weight of dibenzyltoluene is added to benzyltoluene is studied as follows:

Provided that the dibenzyltoluene is non-crystalline as described in the above reference, that is, it is always in a liquid state, the relation between the solid-liquid equilibrium and temperatures is in the state as shown in FIG. 2, which is calculated according to the foregoing solid-liquid equilibrium equation.

According to FIG. 2, the beginning temperature of crystallizing out is lower by about 5° C. as compared with that of FIG. 1. After exceeding −20° C., o-benzyltoluene and p-benzyltoluene begin to separate out.

The proportion of solid phase already exceeds 50 wt % at −30° C., 64.5 wt % at −45° C. and 69.3 wt % at −50° C.

In comparison with the foregoing FIG. 1, the composition is not all solid even in the low temperature of −40° C. to −50° C. That is, the composition is apparently improved in view of the existence of the liquid phase. However, in the liquid phase composition with regarding the whole liquid phase as 100%, the proportion of the dibenzyltoluene is 42% at −30° C., 56% at −40° C. and as much as 65% at −50° C. Thus, it is not desirable in low temperature region and the proportion of the dibenzyltoluene which is unavoidably added in order to lower the melting point exceeds one half quantity in the important liquid phase.

Meanwhile, a mixture of benzyltoluene and dibenzyltoluene was separately prepared so as to correspond to the composition of the above liquid phase portion, and its viscosity was measured by the inventors of the present invention. As a result, it was understood that the viscosity was too high to be measured at −50° C.

As described above, the crystallizing out can be surely avoided by mixing the dibenzyltoluene, however, this phenomenon is owing to the increase of its viscosity, therefore, it is not desirable.

The above depends upon the solid-liquid equilibrium in which 20 wt % of dibenzyltoluene is mixed. When the quantity of dibenzyltoluene is reduced to a level lower than 20 wt %, the effect to improve the melting point is lowered. On the other hand, when more than 20 wt % is added, even though the melting point is lowered, the viscosity is increased to impair the advantage of the benzyltoluene.

In order to eliminate such a contradiction, the homologues of benzyltoluene were prepared. The determination of properties of them and the evaluation of them as impregnating oils using model capacitors at low temperatures were carried out repeatedly, as a result, important measures to solve the problem were found out.

One of them relates to the compounds to be added in order to improve the solid-liquid equilibrium with making the best of excellent properties of bicyclic aromatic hydrocarbons having a diphenylmethane skeletal structure such as benzyltoluene. The second one relates to the conditions for selecting the compositions which have excellent low temperature characteristics as insulating oils for capacitors.

Accordingly, necessary basic properties were measured and at the same time, in order to evaluate the properties as insulating oils for capacitors, the position isomer compositions of alkyldiphenylmethanes having a diphenylmethane skeletal structure as shown in Table 2 were synthesized. The compositions shown in the same table were those obtained by distillation after the synthesis.

In Table 2, the Compounds A to E were synthesized by reacting benzyl chloride with toluene, ethylbenzene and isopropylbenzene, respectively, in the presence of $FeCl_3$ catalyst or $AlCl_3$ catalyst. However, the composition of Compound B was prepared by reacting benzyl chloride with toluene in the presence of $FeCl_3$ catalyst and $AlCl_3$ catalyst separately, and after distillation, both the products were mixed together to prepare Compound B. The Compound F was prepared by alkylating diphenylmethane with propylene in the presence of strong-acid ion exchange resin catalyst.

TABLE 2

| Symbol of Compound | Compound | Composition of Position Isomers (wt %) o-Isomer | m-Isomer | p-Isomer | Catalyst for Synthesis |
|---|---|---|---|---|---|
| A | Benzyltoluene | 48.9 | 6.8 | 44.3 | $FeCl_3$ |
| B | Benzyltoluene | 31.8 | 32.5 | 35.7 | $AlCl_3/FeCl_3$ |
| C | Ethyldiphenylmethane | 31.6 | 10.1 | 58.3 | $FeCl_3$ |
| D | Isopropyldiphenylmethane | 28.3 | 11.6 | 60.1 | $FeCl_3$ |
| E | Isopropyldiphenylmethane | 1.0 | 66.7 | 32.3 | $AlCl_3$ |
| F | Isopropyl- | 17.4 | 33.6 | 49.0 | Strong-Acid(*) |

TABLE 2-continued

| Symbol of Compound | Compound | Composition of Position Isomers (wt %) o-Isomer | m-Isomer | p-Isomer | Catalyst for Synthesis |
|---|---|---|---|---|---|
| | diphenylmethane | | | | Ion Exchange Resin |

Note: (*)Trademark: AMBERLYST-15 of Rohm & Haas Co.

In the following Table 3, the melting points and the heats of fusion as pure substances of the compounds with regard to the position isomers which are synthesized isomers in Table 2 are shown except those of benzyltoluenes which are already shown in Table 1.

TABLE 3

Melting Points and Heats of Fusion of Alkyldiphenylmethanes

| Compound | Melting Point (°C.) | Heat of Fusion (cal/mol) |
|---|---|---|
| o-Ethyldiphenylmethane | −11.2 | 5200 |
| m-Ethyldiphenylmethane | −9.2 | 6400 |
| p-Ethyldiphenylmethane | −23.5 | 5200 |
| o-Isopropyldiphenylmethane | −9 | 3760 |
| m-Isopropyldiphenylmethane | −29 | 4070 |
| p-Isopropyldiphenylmethane | −11 | 3740 |

In Table 3, the values with regard to ethyldiphenylmethanes were all quoted from references and the values with regard to isopropyldiphenylmethanes were actually measured using Specific Heat Measuring Device (Type: SH-3000) made by Shinku Riko Co., Ltd., in which each isomer was separately synthesized by a different method and the products were refined to be used for measuring.

The eutectic point of ethyldiphenylmethanes is −39° C. when it is calculated according to the solid-liquid equilibrium equation with the data in the above table, so that the ethyldiphenylmethanes are in solid phase even when they are mixed in any ratio of isomers. Accordingly, it is difficult to use the mixture of the isomers of ethyldiphenylmethane singly at a low temperature of −40° C. or −50° C. Even though the melting points of the isomers of isopropyldiphenylmethane are not so different from those of ethyldiphenylmethanes, the eutectic point of the mixture of three kinds of isomers of isopropyldiphenylmethane is −50.2° C. because their heats of fusion are low. The composition at the eutectic point is approximately o-isomer: 27 wt %, m-isomer: 45 wt % and p-isomer: 28 wt %. Because the eutectic point of isopropyldiphenylmethanes is lower than that of ethyldiphenylmethanes, there may be a possibility that the isopropyldiphenylmethanes are used at low temperatures. However, the aromaticity per one molecule is lower than benzyltoluenes, so that the hydrogen gas absorbing capacity and the voltage withstanding characteristic of capacitor are low. Therefore, even when a isomer mixture of isopropyldiphenylmethane is prepared, it cannot be used singly as an electrical insulating oil, especially the insulating oil for capacitors.

Then, among the bicyclic aromatic hydrocarbons, the viscosities at low temperatures of the compounds having a biphenyl skeleton and those having a diphenylethane skeleton (other than the diphenylmethane skeleton) were compared with the viscosities of the foregoing diphenylmethanes having a diphenylmethane skeleton.

When Compound C of the diphenylmethane skeletal structure having 15 carbon atoms (the position isomer mixture of ethyldiphenylmethanes in Table 2) is compared with MIPB of the biphenyl skeletal structure having the same number of carbon atoms, the viscosity at −50° C. of the former is only 90 cSt but that of the latter is as high as 12,000 cSt.

When Compound D of the diphenylmethane skeletal structure having 16 carbon atoms (the position isomer mixture of isopropyldiphenylmethanes in Table 2) is compared with PXE of the diphenylethane skeletal structure having the same number of carbon atoms, the viscosity at −50° C. of the former is only 260 cSt but that of the latter is as high as about 50,000 cSt.

Accordingly, it can be said that the the viscosities of bicyclic aromatic hydrocarbons of diphenylmethane skeletal structure are quite low as compared with the bicyclic aromatic hydrocarbons of other basic skeletal structures.

Therefore, it is significant to use the above diphenylmethanes with nuclear-substituted alkyl groups having, for example, 15 or 16 carbon atoms as one of the components for electrical insulating oils having excellent low temperature characteristics.

In the present invention, the above-described nuclear-substituted alkyldiphenylmethanes having 17 or less carbon atoms are mixed into benzyltoluenes, which is different from the proposal of the foregoing U.S. Pat. No. 4,523,044. Even though the viscosity of the compound having a diphenylmethane skeleton is low, the viscosity of alkyldiphenylmethane having 18 or more carbon atoms is high because its molecular weight is too high. Accordingly, an influence similar to the addition of dibenzyltoluene is caused to occur, which is not desirable.

It is necessary that the quantity of benzyltoluene is 40 wt % or more in the composition of the present invention. If the quantity is less than 40 wt %, the advantage of high hydrogen gas absorbing capacity and also high voltage withstanding characteristic due to the high aromaticity of the benzyltoluene itself is impaired, so that it is not desirable as an electrical insulating oil, especially the insulating oil for capacitors, even when the low temperature characteristics are good.

In the present invention, the alkyl-substituted diphenylmethanes to be added to benzyltoluene are represented by the foregoing formula (I). More particularly, they are exemplified by diphenylmethane, ethyldiphenylmethane, isopropyldiphenylmethane, n-propyldiphenylmethane, methylethyldiphenylmethane, butyldiphenylmethane, diethyldiphenylmethane, methylpropyldiphenylmethane, and, if exist, their position isomers. Among them, preferable ones are ethyldiphenylmethane and isopropyldiphenylmethane.

In order to expect the effect of the addition of alkyl-substituted diphenylmethanes of the formula (I), they must be contained as much as 10 wt % or more, or preferably more than 15 wt % in the composition of the present invention.

With regard to the systems of benzyltoluene to which alkyldiphenylmethane was added, the contents of solid phase (the weight percentages of crystals to the whole mixtures) in the equilibrium state at the low temperature of −40° C. or −50° C. were calculated. The results are shown in the following Table 4. Incidentally, compounds in the table are the same as those in the foregoing Table 2. In Table 4, "benzyltoluene 80%" indicates a mixture containing 80 wt % of benzyltoluene and "benzyltoluene 50%" indicates a mixture containing 50 wt % of benzyltoluene.

As will be understood from the values in the same table, when −40° C. or −50° C. is considered as the practically aimed temperature for low temperature characteristics, the solid phase exist in almost all of, though not all of, the mixture systems of benzyltoluene and alkyldiphenylmethane. That is, crystals are separated out in the systems.

Provided that the preferable electrical insulating oil which is excellent in low temperatures contains no crystal, that is no crystallizing out occurs at aimed low temperatures. Though it is not impossible but quite difficult to obtain an electrical insulating oil having excellent low temperature characteristics from the mixture of benzyltoluene and alkyldiphenylmethane.

TABLE 4

Contents of Solid Phase in Benzyltoluene Mixtures
(Values in Equilibrium at Low Temperatures)
(% by weight)

| | Mixing Ratio | | Benzyltoluene 80 wt % | | Benzyltoluene 50 wt % | |
|---|---|---|---|---|---|---|
| No. | Benzyl-toluene | Alkyl-diphenyl-methane | −40° C. | −50° C. | −40° C. | −50° C. |
| 1 | Comp. A | Comp. C | 62 | 76 | 20 | 83 |
| 2 | Comp. A | Comp. D | 62 | 73 | 22 | 60 |
| 3 | Comp. A | Comp. E | 62 | 73 | 22 | 40 |
| 4 | Comp. A | Comp. F | 62 | 69 | 22 | 43 |
| 5 | Comp. B | Comp. C | 30 | 52 | 0.3 | 32 |
| 6 | Comp. B | Comp. D | 31 | 54 | 2 | 27 |
| 7 | Comp. B | Comp. E | 31 | 54 | 2 | 17 |
| 8 | Comp. B | Comp. F | 31 | 54 | 2 | 17 |

In order to discuss the relation between the existence of solid phase and the partial discharge with developing the problem, the following assumption is made. The beginning of crystallizing out occurs at many irregular points and crystals gradually grow. When the crystals happen to cover relatively weak portions such as the peripheries of electrode and defective portions of solid insulating material into which electric potential is concentrated, the function of the insulating oil is hindered to cause the occurrence of partial discharge by the application of low electric voltage. With such the assumption, the relation between the lowering of partial discharge voltage owing to the crystallizing out and the quantity of crystals depends upon the probability of the existence of crystals in the relatively weak portions. Accordingly, if a small amount of crystals are separated out, the partial discharge can occur even though its probability is small. Therefore, it will be accepted that the benzyltoluene and alkyldiphenylmethane in which the possibility of solid phase to exist at low temperatures is high, is not desirable as an electrical insulating oil for use at low temperatures.

The inventors of the present application impregnated foil-wound type capacitors using only polypropylene film as a dielectric material with mixtures of benzyltoluene and alkyldiphenylmethane and the capacitors were subjected to repeated electrical loads at low temperatures to measure the voltages of partial discharge, thereby observing the behavior of partial discharge. At the same time, the proportions of solid phase at low temperatures were calculated according to the foregoing solid-liquid equilibrium equation. Thus, the relation between the behavior of partial discharge and the quantities of solid phase were investigated in detail.

The behavior of partial discharge at low temperatures of −40° C. and −50° C. of the capacitors which are impregnated with the mixture of benzyltoluene and alkyldiphenylmethane is classified into the following three conditions (a) to (c).

(a) The partial discharge starts at a potential gradient of 20 to 50 V/μ in charged voltage, in addition, the dielectric breakdown is sometimes caused to occur during measurement.

(b) The partial discharge starts at a relatively high potential gradient of 40 to 100 V/μ. In the plurality of measurement on each capacitor, the deviation of obtained values is large and no reproducibility is found.

(c) The starting voltages of partial discharge are on high levels even in condition (d) where a solid phase exists, which levels are almost equal to those when the insulating oils are all liquid phase without any solid phase. In addition, the reproducibility of obtained values is good likewise. Accordingly, capacitors can have functions just like the conditions in which they are impregnated with all liquid phase.

When the data with regard to capacitors were arranged according to this classification, it was found out that there is a correlation between the states of partial discharge at low temperatures of −40° C. and −50° C. and the quantities of solid phase calculated by the solid-liquid equilibrium equation at these temperatures.

That is, in the mixtures of benzyltoluene and alkyldiphenylmethane, the state of partial discharge of capacitors is in the above condition (b) when the calculated quantity of solid phase exceeds 45 wt % but the system is not all solid, and measured starting voltages of partial discharge are quite worse in reproducibility. In the case that the quantity of solid phase is not more than 45 wt %, however, it was confirmed that the above condition (c) was applied rather than the condition (b), that is, the state of partial discharge was like that of the system of substantially all liquid. Incidentally, for confirmation purpose, the partial discharge of capacitors was observed by cooling them to temperatures below −50° C. into the state of 100% solid phase, in which the state of partial discharge was in the above condition (a).

As described above, the finding that capacitors can function sufficiently even when the solid phase exists up to 45 wt %, apparently contradicts the foregoing supposition that the dielectric breakdown of capacitors is related to the separating out of crystals under probability. However, this may be solved as follows:

When the quantity of solid phase exceeds 45 wt % in the electrical insulating oil of an impregnated capacitor, the volume of solid phase becomes larger than the volume of liquid phase. The liquid phase is thus isolated or dispersed to form the so-called dispersion phase, or even when it is a continuous phase, it is an insufficient continuous phase in which it is connected through minute spaces among many a crystal. Therefore, in view of mass transfer, such a state is regarded as a substantially dispersed phase, not a continuous phase. In such a case, when hydrogen gas and other gases are generated as a preliminary phenomenon of partial discharge, the produced gases cannot be diffused and absorbed sufficiently. If the partial discharge of capacitors is measured when the impregnated electrical insulating oil of capacitors is in a state like this, the partial discharge is started by low electrical loads from the points in which the sufficient transfer of gas is inhibited. Furthermore, in microscopic view, the forms and volumes of the respective substantially isolated portions of the liquid phase are considered to be uneven, so that when the points which are liable to generate gases overlap the points in which the diffusion and absorption of gases difficultly occur in view of mass transfer, the partial discharge can be initiated by a very lower electric voltage As a result, the starting voltages of partial discharge is worse in reproducibility like the foregoing condition (b).

On the other hand, if the quantity of solid phase is 45 wt % or less, the proportion of the volume of solid phase is further smaller by the difference between the specific gravities of the solid phase and the liquid phase. As a result, it is considered that the liquid phase exists as a continuous phase.

The above-mentioned mass transfer of generated gases relates to the factors of the gas diffusion in the liquid and the transfer of the liquid itself. Anyway, it is desirable that the viscosity is low for the mass transfer. In the present invention, the viscosities of benzyltoluenes themselves are low and, in addition, the alkyldiphenylmethanes are also the hydrocarbons having quite low viscosity. Accordingly, they are advantageous in view of mass transfer. Therefore, it is considered that they function like the state of substantially all liquid phase even when the solid phase exists as much as approximately 45 wt %.

Furthermore, when a small amount of crystals is incidentally separated out and they are directly deposited on the end portions of electrode, it is considered that there occurs no significant problem.

In other words, it is known that the power loss of capacitors can be reduced by eliminating pointed portions, for example, by making the end portions of electrode round. From this fact, it is understood that electric potential is concentrated to the pointed or deformed portions of electrodes and heat is generated by the consumption of electric power. Accordingly, when an electrode is outwardly deformed by the deposition of crystals, heat is generated in the deformed portion and the crystals in contact with at least the electrode are fused into liquid. Thus the electrode is substantially covered by liquid phase and therefore, there is no problem in view of the partial discharge.

The composition of the present invention comprises a mixture of benzyltoluene and alkyldiphenylmethane other than benzyltoluene, having 15 to 17 carbon atoms. The composition can be prepared by selecting the kinds and proportions of the above benzyltoluene and alkyldiphenylmethane including their position isomers so as to make the proportion of solid phase 45% by weight or less in the composition at −40° C., by calculating according to the solid-liquid equilibrium equation. However, it is necessary that the quantity of benzyltoluene is 40 wt % or more in the composition. In order to improve the low temperature characteristics, it is desirable that the quantity of solid phase is made 45 wt % or less at a temperature of −50° C.

When the electrical insulating oil composition according to the present invention is used, other known electrical insulating oils can be added at arbitrary ratios within the object of the invention. Exemplified as such electrical insulating oils are phenylxylylethane and diisopropylnaphthalene.

The capacitors that are suitable for the impregnation with the electrical insulating oil composition of the present invention are the so-called foil-wound capacitors. The capacitors of this kind are made by winding metal foil such as aluminum foil as an electrode together with plastic film as a dielectric or insulating material in layers to obtain capacitor elements, which are then impregnated with an electrical insulating oil. Though insulating paper can be used together with the plastic film, the use of plastic film only is preferable. As the plastic film, polyolefin film such as biaxially oriented polypropylene film is desirable. The impregnation of the electrical insulating oil composition into the capacitor elements can be done according to the conventional method.

According to the present invention, an electrical insulating oil containing 40 wt % or more of benzyltoluene is excellent in hydrogen gas absorbing capacity. The capacitors impregnated with this electrical insulating oil is quite excellent in the voltage withstanding characteristic.

Both the benzyltoluene and the alkyldiphenylmethane to be added to it have low viscosities at low temperatures. Accordingly, the viscosity of the mixture of the present invention is also very low. Therefore, even though much solid phase of approximately 45 wt % exists in the insulating oil, it can function as an insulating oil, thereby providing an electrical insulating oil having good low temperature characteristics.

Furthermore, the quantity of solid phase is regulated by the finding on the relation between the partial discharge and the calculated proportion of solid phase at low temperatures. Accordingly, the prepared electrical insulating oil can function sufficiently at low temperatures of −40° C. to −50° C. like an all liquid insulating oil.

In the following, the present invention will be described in more detail with reference to examples.

EXAMPLE

Experiment 1

The capacitors used in the experiment were as follows:

As the solid insulating material, a simultaneously stretched biaxially oriented polypropylene film of impregnation type that was made by Shin-etsu Film Co., Ltd. through tubular method, was used.

Two sheets of the film of 14μ thick (micrometer method) was wound together with an electrode of aluminum foil to make capacitor elements of 0.3 to 0.4 μF in electrostatic capacity, which were put in a tin can. The can was flexible one so as to compensate the shrinkage of an insulating oil at low temperatures. The end portion of the electrode was not folded and left in the state as slit.

As the method to connect the electrode to a terminal, it is commonly done that a ribbon-like lead foil is inserted to the face of electrode in the capacitor element. With this method, the contact between the lead foil and the electrode becomes worse when crystals separate out and partial discharge occurs on the electrode, which makes the measurement impossible. In this experiment, therefore, the electrode was wound with its end protruded from the film and the protruded portions were connected together to the lead foil by spot-welding.

The thus prepared can-type capacitors were subjected to vacuum drying in an ordinary manner, and under the same vacuum condition, it was impregnated with an insulating oil, which was followed by sealing. It was then subjected to heat treatment at a maximum temperature of 80° C. for 2 days and nights in order to make the impregnation uniform and stabilized. After leaving it to stand at room temperature for 5 days, AC 1400 V (corres. to 50 V/μ) was applied to the capacitor for 16 hours in a thermostat at 30° C. and it was used for experiment.

The electrical insulating oils used for the impregnation were prepared by mixing at predetermined ratios of the mixture (B) of benzyltoluene isomers and the mixture (F) of the isomers of isopropyldiphenylmethane listed in the foregoing Table 2.

The impregnated capacitors were cooled for 1 week with temperature cycles to maintain them at the measuring temperature in the daytime and at a temperature lower by 10° C. than the measuring temperature in the nighttime. After that the capacitors were left to stand for 24 hours and used for the measurement.

A power supplier having a mechanism (zero cross start) which is started when alternating voltage becomes 0 after switched on, was used.

The charge of voltage was started at a value which is 20 V/μ higher than the above presumed partial discharge initiating voltage (PDIV) in the conventional measuring method of the ramp test. The time length to start partial discharge (hereinafter referred to as "PDST" was measured with maintaining the voltage constant. The detection of discharge and measurement of time were done by a data processing device of a precision of 0.02 second that was installed with a microprocessor. The voltage was then lowered by 5 V/μ to measure PDST. After that, the voltage was lowered by 5 V/μ step by step until the measured time exceeded 1 second. "The voltage by which partial discharge occurs after 1 second" was obtained by interpolation, which value is hereinafter referred to as "PDIV 1 sec value".

As is clearly understood from the following description, the test results using PDIV 1 sec values were very reproducible as a measurement method.

At each mixing ratio, 5 capacitors were used and the measurement was done 5 times for each capacitor to obtain 25 resultant values.

Figure 3:
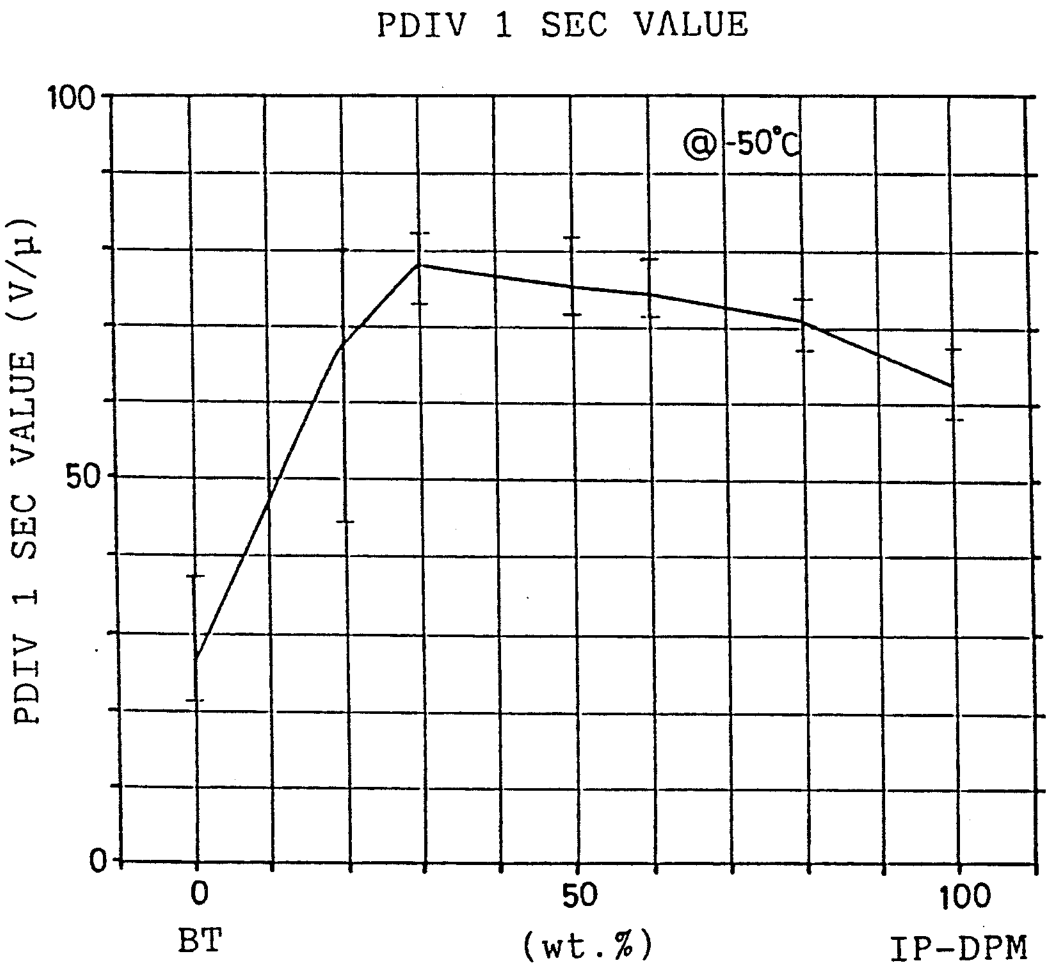
FIG. 3 is a graphic chart showing PDIV 1 sec values, wherein the vertical range on each dot indicates the range of variation of PDIV 1 sec values.

The minimum and the maximum of PDIV 1 sec values at measuring temperature of −50° C. with regard to each mixing ratio of benzyltoluene (BT) and isopropyldiphenylmethane (IP-DPM) are shown in FIG. 3.

Figure 4:
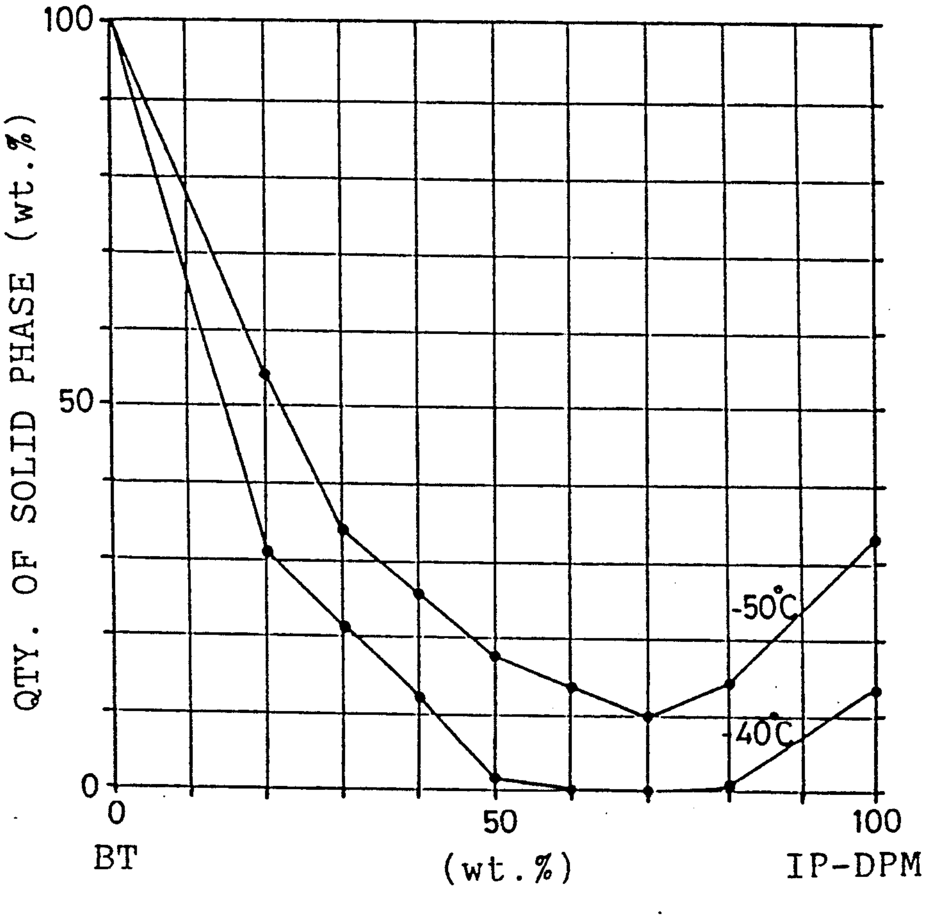
FIG. 4 is a graphic chart showing the quantities of solid phase.
Figure 5:
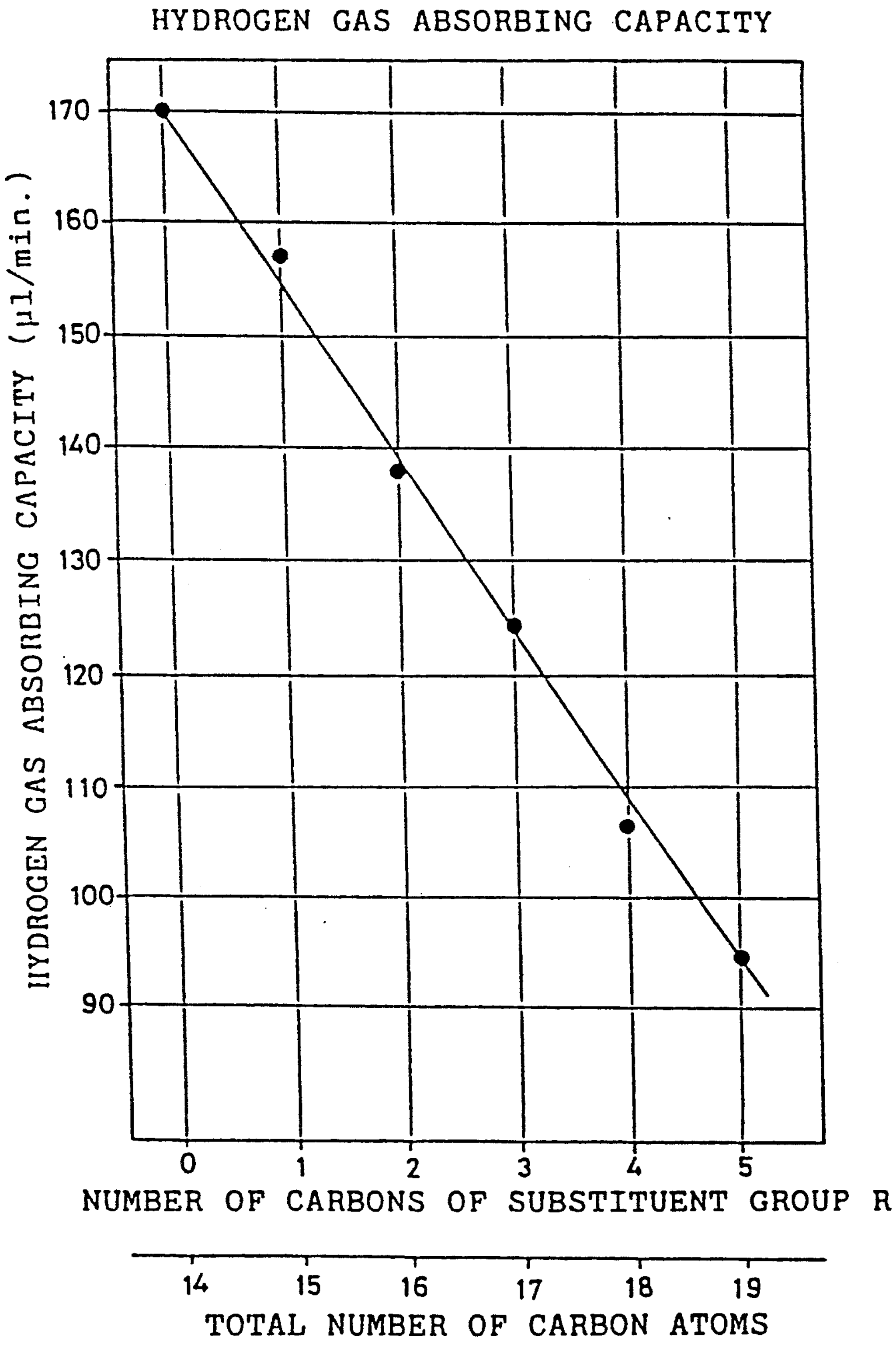
FIG. 5 is a graphic chart showing hydrogen gas absorbing capacities of alkyldiphenylethanes.

The proportions (wt %) of the total solid phase to the whole composition calculated according to the foregoing solid-liquid equilibrium equation are shown in FIG. 4 with regard to each mixing ratio of benzyltoluene (BT) and isopropyldiphenylmethane (IP-DPM). In the same figure, the proportions (wt %) of solid phase at −40° C. are also shown.

The following facts will be understood in view of FIG. 3 and FIG. 4, together.

In the relation between the proportions of solid phase and the minimum and maximum of PDIV 1 sec values, in the case that the proportion of solid phase is 45 wt % or less, the width between the minimum and maximum of PDIV 1 sec values hardly varies even when the solid phase exists. That is, the behavior is the same as that of liquid phase even when the solid phase exists. This corresponds to the foregoing condition (c). If the proportion of solid phase exceeds 45 wt %, the width between the minimum and maximum becomes large and the reproducibility is worsened seriously. This corresponds to the foregoing condition (b). Even though the reproducibility is made better in the 100% solid phase, the PDIV 1 sec values themselves are very low. This is the foregoing condition (a).

In view of the PDIV 1 sec values themselves and the proportions of components, when the proportion of solid phase is not more than 45 wt %, the PDIV 1 sec values themselves are lowered with the lowering of the content of benzyltoluene, even though the reproducibility of PDIV 1 sec values is not changed. In the case of isopropyldiphenylmethane only, the PDIV 1 sec values are lowered considerably. Meanwhile, in the case of benzyltoluene only, even when it is a mixture of three isomers, the PDIV 1 sec value at −50° C. is very low.

It is understood from the above facts that, in order to attain high PDIV 1 sec values and good reproducibility, benzyltoluene and isopropyldiphenylmethane must he mixed and that the proportion of solid phase must be not more than 45 wt %.

Experiment 2

Using the electrical insulating oils No. 1 to 8 in the foregoing Table 4, the reproducibility of PDIV 1 sec values were measured at 25° C. (R.T.), −40° C. and −50° C. in the like manner as in Experiment 1. The results are shown in the following Table 5. In the table, the states (b) and (c) are the same as the foregoing conditions (b) and (c), that is, the state of partial discharge (c) showed the reproducibility which is almost the same as that of all liquid phase (d). The state of partial discharge (b) showed very bad reproducibility.

TABLE 5

| | Mixing Ratio | | Contents of Solid Phase and Partial Discharge (% by weight) | | | | | | | |
|---|---|---|---|---|---|---|---|---|---|---|
| | | | Benzyltoluene 80 wt % | | | | Benzyltoluene 50 wt % | | | |
| No. | Benzyl-toluene | Alkyl-diphenyl-methane | R.T. | State of Partial Discharge | −40°C. | State of Partial Discharge | R.T. | State of Partial Discharge | −50°C. | State of Partial Discharge |
| 1 | Comp. A | Comp. C | 0 | (d) | 62 | (b) | 0 | (d) | 83 | (b) |
| 2 | Comp. A | Comp. D | 0 | (d) | 62 | (b) | 0 | (d) | 60 | (b) |
| 3 | Comp. A | Comp. E | 0 | (d) | 62 | (b) | 0 | (d) | 40 | (c) |
| 4 | Comp. A | Comp. F | 0 | (d) | 62 | (b) | 0 | (d) | 43 | (c) |
| 5 | Comp. B | Comp. C | 0 | (d) | 30 | (c) | 0 | (d) | 32 | (c) |
| 6 | Comp. B | Comp. D | 0 | (d) | 31 | (c) | 0 | (d) | 27 | (c) |
| 7 | Comp. B | Comp. E | 0 | (d) | 31 | (c) | 0 | (d) | 17 | (c) |
| 8 | Comp. B | Comp. F | 0 | (d) | 31 | (c) | 0 | (d) | 17 | (c) |

It is apparent from the results in Table 5 that even when a mixture comprises benzyltoluene and alkyldiphenylmethane, if the position isomers of each compound are not selected appropriately, superior capacitors cannot be prepared.

That is, as is evident from the data in Tables 1 and 3, even for the same compound, position isomers can exhibit different basic physical properties.

Therefore, in order to produce superior capacitors, it is necessary to select appropriately the mixing ratios of position isomers with great care.

As already described, U.S. Pat. No. 4,054,937 discloses mixtures of diphenylmethane type compounds. However, there is no suggestion in this patent with regard to the existence of position isomers of these compounds and the influence of these isomers on the performance of capacitors.

Furthermore, from the results of Table 5, it is clear that the state of partial discharge of capacitors is (b) when the quantity of solid phase exceeds 45 wt %, which is not desirable because it leads to the breakdown of capacitors as already described. On the other hand, when the quantity of solid phase is not more than 45 wt %, the state is (c) or (d). In these latter stages, the starting voltages of partial discharge are on high levels.

What is claimed is:

1. In a method of preparing an electrical capacitor including the steps comprising:

(i) rolling a metal foil electrode together with a material in layers to provide capacitor elements,.

(ii) disposing said elements in a container and (iii) impregnating said elements with an electrical insulating oil which can be used at temperatures as low as −40° C., the improvement which comprises:

employing as said electrical insulating oil an oil composition comprising a mixture of 40% by weight or more of benzyltoluene and the remainder of alkyl substituted diphenylmethane having 15 to 17 carbon atoms which is represented by the following general formula:

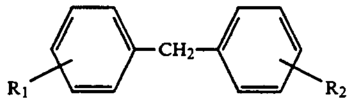

wherein $R_1$ and $R_2$ are hydrogen or $C_1$ to $C_4$ alkyl groups and the total number of carbon atoms in $R_1$ and $R_2$ is 2 to 4, with the proviso that $R_1$ and $R_2$ may not simultaneously be methyl groups; and the proportion of the total quantity of solid phase calculated according to the following general solid-liquid equilibrium equation is 45% by weight or less relative to the total quantity of said composition at −40° C:

$$X_i = \exp\left[\frac{\Delta Hf}{R}\left(\frac{1}{Tf} - \frac{1}{T}\right)\right]$$

wherein $X_1$ is the equilibrium mole fraction of a component i of said 7 components in the liquid phase of said composition, $Hf$ is the heat of fusion ($cal.mol^{-1}$) of said component i as a pure substance, $T_if$ is the melting point (K) of said component i as a pure substance, T is the temperature (K) of the system, and R is the gas constant ($cal.mol^{-1}.K^{-1}$).

2. The method of Claim 1 wherein the temperature of step (iii) is −50° C. and the portion of solid phase is at a temperature of −50° C.

3. The method of Claim 1 wherein the dielectric material is a plastic film.

4. The method of Claim 3 wherein the plastic film is a polyolefin film.

5. The method of Claim 4 wherein the polyolefin film is polypropylene film.

6. In the method of operating an oil filled capacitor of the type capable of operating at temperatures as low as −40° C., said method including the steps of charging and discharging said capacitor at a temperature as low as −40° C., the improvement which comprises:

employing as said oil in said oil filled capacitor an electrical insulating oil composition comprising a mixture of 40% by weight or more of benzyltoluene and the remainder of alkyl substituted diphenylmethane having 15 to 17 carbon atoms which is represented by the following general formula:

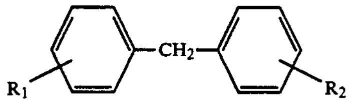

wherein $R_1$ and $R_2$ are hydrogen or $C_1$ to $C_4$ alkyl groups and the total number of carbon atoms in $R_1$ and $R_2$ is 2 to 4, with the proviso that $R_1$ and $R_2$ may not simultaneously be methyl groups, and the proportion of the total quantity of solid phase calculated according to the following general solid-liquid equilibrium equation is 45% by weight or less relative to the total quantity of said composition at −40° C.:

$$X_i = \exp\left[\frac{\Delta Hf}{R}\left(\frac{1}{Tf} - \frac{1}{T}\right)\right]$$

wherein $X_1$ is the equilibrium mole fraction of a component i of said 7 components in the liquid phase of said composition, $Hf$ is the heat of fusion ($cal.mol^{-1}$) of said component i as a pure substance, $Tf$ is the melting point (K) of said component i as a pure substance, T is the temperature (K) of the system, and R is the gas constant ($cal.mol^{-1}.K^{-1}$).

7. The method of claim 6 wherein the operating temperature is as low as −50° C. and the charging and discharging is at a temperature as low as −50° C.

8. The method of claim 6 wherein the capacitor comprises a dielectric material of a plastic film.

9. The method of claim 8 wherein the plastic film is a polyolefin film.

10. The method of claim 9 wherein the polyolefin film is polypropylene film.

* * * * *

UNITED STATES PATENT AND TRADEMARK OFFICE
CERTIFICATE OF CORRECTION

PATENT NO. : 5,134,761

DATED : August 4, 1992

INVENTOR(S) : Atsushi Sato, et al.

It is certified that error appears in the above-identified patent and that said Letters Patent is hereby corrected as shown below:

Column 2, lines 67-68: after "derivatives" insert --.--

Column 6, line 53: "hats" should read as --heats--.

Column 15, lines 8-9: after "voltage" insert --.--

Column 19, line 25, Claim 1: "with a" should read as --with a dielectic--

Signed and Sealed this

Ninth Day of November, 1993

Attest:

Bruce Lehman

BRUCE LEHMAN

*Attesting Officer*

*Commissioner of Patents and Trademarks*